United States Patent
Epstein, III et al.

(10) Patent No.: US 6,396,400 B1
(45) Date of Patent: May 28, 2002

(54) SECURITY SYSTEM AND ENCLOSURE TO PROTECT DATA CONTAINED THEREIN

(76) Inventors: Edwin A. Epstein, III; Souk Souvannavong, both of 5868 A-1 Westheimer, Suite 514, Houston, TX (US) 77057; Chia-Sheng Lu, 3500 S. Nellis Blvd., #1042, Las Vegas, NV (US) 89121

( * ) Notice: Subject to any disclaimer, the term of this patent is extended or adjusted under 35 U.S.C. 154(b) by 0 days.

(21) Appl. No.: 09/360,787

(22) Filed: Jul. 26, 1999

(51) Int. Cl.[7] .............................................. G08B 13/00
(52) U.S. Cl. ...................... 340/550; 340/541; 340/540; 713/194
(58) Field of Search ................................ 340/550, 545.2, 340/565, 541, 540; 365/52; 713/194

(56) References Cited

U.S. PATENT DOCUMENTS

| | | | |
|---|---|---|---|
| 3,990,069 A | * 11/1976 | Schuman | 340/544 |
| 4,575,610 A | * 3/1986 | Gavin | 219/121.6 |
| 4,807,284 A | * 2/1989 | Kleijne | 713/194 |
| 4,811,288 A | * 3/1989 | Kleijne et al. | 365/52 |
| 4,998,279 A | 3/1991 | Weiss | 380/23 |
| 5,159,629 A | 10/1992 | Double et al. | 380/4 |
| 5,185,717 A | * 2/1993 | Mori | 365/52 |
| 5,309,387 A | * 5/1994 | Mori | 365/52 |
| 5,353,350 A | 10/1994 | Unsworth et al. | 380/3 |
| 5,432,850 A | 7/1995 | Rothenberg | 380/23 |
| 5,596,718 A | 1/1997 | Boebert et al. | 395/187.01 |
| 5,636,282 A | 6/1997 | Holmquist et al. | 380/23 |
| 5,778,071 A | 7/1998 | Caputo et al. | 380/25 |
| 5,790,670 A | 8/1998 | Bramlett | 380/52 |
| 5,878,142 A | 3/1999 | Caputo et al. | 380/25 |

OTHER PUBLICATIONS

*A complete CEM detector system for vacuum use*, Electron And ION Detector Amptektron®, MD–501.
*Frequently Asked Questions*, Tellurex Corporation.

* cited by examiner

Primary Examiner—Jeffery Hofsass
Assistant Examiner—Sihong Huang
(74) Attorney, Agent, or Firm—Conley, Rose & Tayon, P.C.; Jonathan M. Harris (57) ABSTRACT

A security system includes a data storage device in which data or other information to be protected is stored. The data storage device, control logic, and other components are contained in a sealed first inner housing. The data storage device stores the data to be protected. The first inner housing is contained within a sealed second inner housing by a plurality of support structures which create an interstitial volume surrounding the first inner enclosure. Both inner housings are contained within an outer housing. A vacuum is created in the interstitial volume between the two inner housings. Both inner housings are sealed thereby precluding air from entering the interstitial volume and defeating the vacuum. One or more pressure sensors monitor the vacuum pressure. If an attempt is made to access the first inner housing, by drilling through the second inner housing or otherwise defeating the second inner housing's seal, the pressure of the interstitial volume will change. Logic coupled to the pressure sensor detects the change in pressure, determines that a security breach has occurred or is occurring and initiates a response to secure the data from theft or tampering. The security response includes erasing the protected data or destroying the data storage device itself prevent access to the data.

37 Claims, 5 Drawing Sheets

SECURITY SYSTEM AND ENCLOSURE TO PROTECT DATA CONTAINED THEREIN

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to a security system for an electronic device. More particularly, the invention relates to an enclosure and security system that protects sensitive data and/or equipment stored in a memory device and/or other types of devices from theft or other unauthorized access.

2. Background of the Invention

The proliferation of computers and memory storage devices has made it easy to create and store sensitive data and software. Because of the sensitive nature of the data or software, the owner of such information naturally desires to keep the information safe from tampering, theft, or other types of unauthorized use or access. The more sensitive is the data to be protected, the greater is the need to protect the data from unauthorized access. Examples of information that often is stored in an electronic device include marketing strategy for a corporation, corporate earnings projections, seismic data regarding a multi-billion dollar oil and gas field, and sensitive attorney-client information.

Sometimes the sensitive data may be stored in a memory device in an electronic system that is not a personal computer, per se. For example, the electronic system may be a storage device that connects to a computer. A user may direct the computer to download sensitive data to the peripheral storage device that may then be connected to another nearby computer or transported to another location for connection to another computer. The sensitive data then can be transferred to the new computer. While the sensitive data is stored in the storage device, it may be highly desirable to protect the data against theft. Accordingly, the storage device should have a highly secure security system to protect the sensitive data.

Accordingly, a security system is needed to protect data. Such a system preferably would make it difficult, if not impossible, to gain access to sensitive data without triggering the security system. Despite the advantages such a security system would provide, to date no satisfactory system is known to exist.

SUMMARY OF THE INVENTION

The deficiencies of the prior art described above are solved in large part by a security system that protects data stored on a data storage device and/or other types of devices. The data storage device containing the data to be protected, control logic, and other components are contained in a sealed first inner housing. The first inner housing is contained within a sealed second inner housing by a plurality of support structures. The support structures provide an interstitial volume completely surrounding the first inner enclosure which includes the data to be protected. Both inner housings are contained within an outer housing. A vacuum is created in the interstitial volume effectively creating a vacuum "moat" surrounding the first inner housing. Both inner housings are sealed thereby precluding air from entering the interstitial volume thereby defeating the vacuum. One or more pressure sensors monitor the vacuum pressure, which preferably is low in accordance with the nature of a vacuum. If an attempt is made to access the first inner housing, by drilling through the second inner housing or otherwise defeating the second inner housing's seal, the pressure of the interstitial volume will change. Logic coupled to the pressure sensor detects the change in pressure, determines that a security breach has occurred or is occurring and initiates a response to secure the data from theft or tampering.

A heat removal system thermally couples to the electronics in the first inner housing to transfer the heat generated therein to the area between the second inner housing and the outer housing. The heat removal system preferably includes a thermoelectric device for a more efficient heat transfer and, if necessary or desired, to warm the electronics in the first inner housing. The security system also includes a power supply, battery, and fan. The fan blows the heat removed by the heat removal system out of the security system.

One or more particle detectors are also included to monitor the interstitial volume which, unless a security breach has occurred, contains a vacuum. The particle detectors provide another mechanism to detect a security breach in the event the security system is placed in a vacuum chamber to match the vacuum pressure in the interstitial volume. In this case, the pressure sensors may not detect a change in pressure if the second inner housing is compromised, for example by a drill, but the particle detectors will detect a change in particle density in the interstitial volume, thereby indicating a security breach.

Thus, the present invention comprises a combination of features and advantages which provide a secure system for sensitive data or other information. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of a preferred embodiment of the present invention, reference will now be made to the accompanying drawings, wherein.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
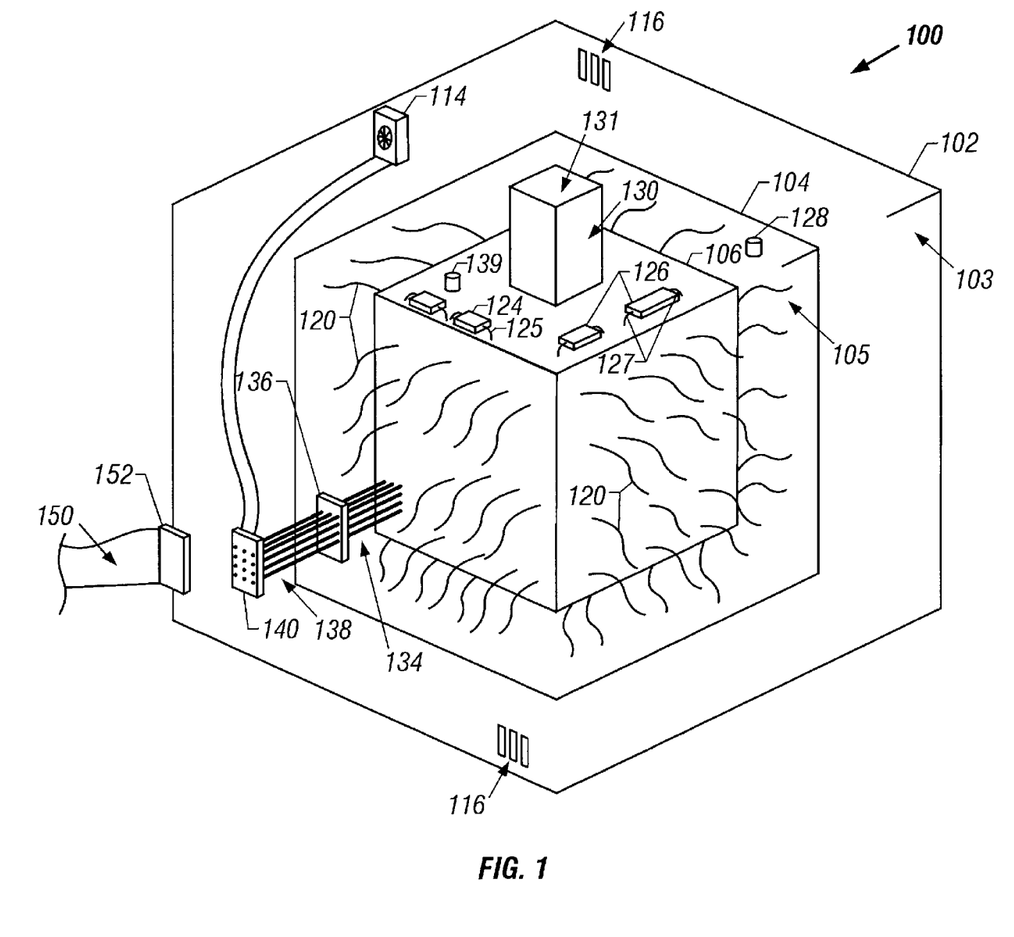
FIG. 1 is a perspective view of a security system and enclosure in accordance with the preferred embodiment.

Referring now to FIG. 1, in accordance with the preferred embodiment, security system 100 includes an outer housing 102, and two inner housings 104 and 106. As shown, a first inner housing 106 (the inner-most housing) resides within the volume defined by second inner housing 104. Second inner housing 104 resides within the volume defined by outer housing 102. First inner housing 106 contains sensitive electronics and/or data (not shown in FIG. 1). Security system 100 includes various security features to protect the sensitive data and/or any desired device or devices contained in first inner housing 106. In general, security system 100 detects any attempt to gain access to, or otherwise tamper with, the area inside the first inner housing 106 that contains the data and/or devices to protect. The preferred embodiment described below will be explained in terms of protecting sensitive data stored on a memory device contained within first inner housing 106. It should be understood, however, that the principles explained herein apply to protecting any type of data, device, and/or equipment contained in first inner housing 106.

Security system 100 also includes a power supply 110 and battery pack 112 (both shown in FIG. 5), a fan 114, a plurality of support structures 120, a plurality of pressure transducers 124 and particle detectors 126, and a heat removal element 130. An external electrical connection can be made to security system 100 via a cable 150 having a connector 152 that mates with a corresponding connector 140 on an exterior surface of outer housing 102. A plurality of electrical conductors 138 connect housing connector 140 to second inner housing connector 136 which, in turn, connects to first inner housing 106 via electrical conductors 134. Alternatively, conductors 138 may pass straight through second inner housing 106 to first inner housing without the use of connector 136.

The pressure transducers 124 preferably mount on an exterior surface of first inner housing 106 and connect electrically via conductors 125 to electronics (not shown in FIG. 1) contained in first inner housing 106. Similarly, particle detectors also mount on an exterior surface of first inner housing 106 and connect electrically via conductors 127 to the electronics contained in first inner housing 106.

Figure 5:
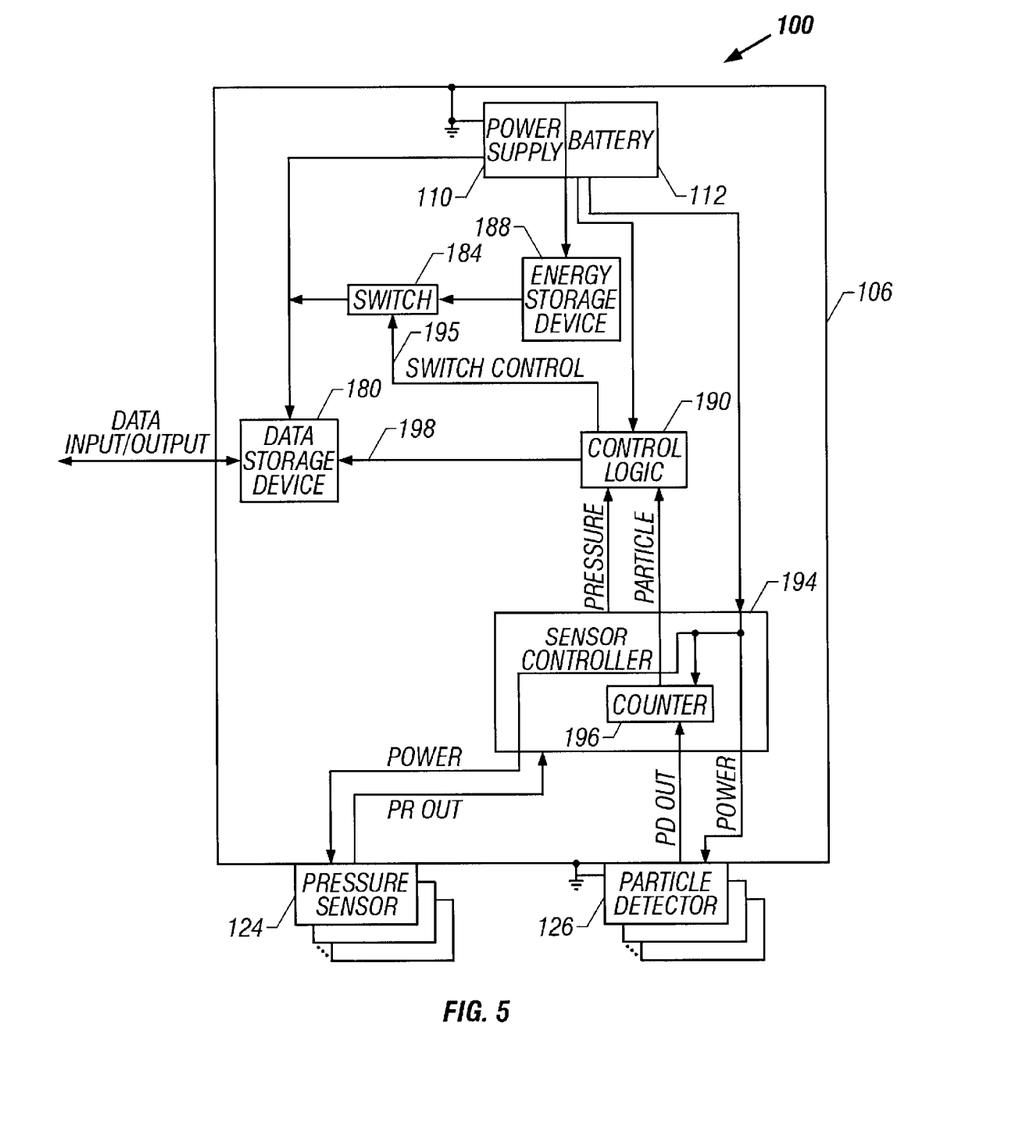
FIG. 5 shows a block diagram of the security system in accordance with a preferred embodiment.

Referring to FIG. 5, the power supply 110 included within first inner housing 106 receives an alternating current ("AC") voltage from cable 150 (e.g., 120 VAC) and conditions the incoming AC power for use by the electronics contained in first inner housing 106. As one of ordinary skill in the art will appreciate, power supply 110 preferably contains a transformer, a rectification circuit such as a common diode bridge, one or more voltage regulators and filters and other components as desired. Accordingly, power supply 110 provides a suitable direct current ("DC") voltage to operate the electronics contained in first inner housing 106. The electronics can also be powered by battery pack 112, also included within first inner housing 106, which, if desired, may comprise rechargeable batteries that are recharged by power supply 110. Thus, power supply 110 preferably includes battery charging circuitry. Fan 114 receives power from power supply 110 and removes warm air produced in the volume 103 between the housings 102 and 104 by blowing the air through vents 116 in the outer housing 102 to the outside.

Referring again to FIG. 1, first inner housing 106 preferably is supported within second inner housing 104 by a plurality of support structures 120. The purpose of support structures 120 is to "suspend" first inner housing 106 containing the data to be protected inside second inner housing 104 so as to permit a vacuum to surround all surfaces of the first inner housing 106. The vacuum is a security feature that is explained below. The support structures preferably are hollow curved tubes as shown, but alternatively can have other curved shapes or be straight if desired.

In accordance with the preferred embodiment, the interstitial volume 105 between the two inner housings 104, 106 is evacuated. That is, a vacuum exists in interstitial volume 105. By "vacuum" it is meant that the pressure of the interstitial volume 105 is less than 10% of ambient air pressure, and more preferably less than 1 torr. Because the support structures 120 effectively suspend the first inner housing 106 inside the second inner housing 104, the vacuum surrounds all sides or surfaces of the first inner housing 106, effectively encapsulating the first inner housing 106. The pressure transducers 124 and associated pressure transducer circuitry (not shown in FIG. 1) monitor the pressure of interstitial volume 105 and can detect any attempt to gain access to first inner housing 106. For example, a person might try to drill through housings 102 and 104 in an attempt to pierce the first inner housing 106 in order to insert an electronic probe or camera into first inner housing 106 to examine the contents thereof. The moment the drill tip pierces the second inner housing 104, however, the vacuum of interstitial volume 105 will be breached and one or more of the pressure transducers will detect the change in pressure and according to a predetermined procedure explained below, react to the attempted security breach.

The vacuum preferably is created during manufacturing through any suitable procedure. For example, a vacuum pump can be attached to port 128, which preferably is a check valve, and the gases initially contained in interstitial volume 105 can be pumped out. The resulting pressure of the vacuum preferably is less than 10% of ambient pressure, and preferably less than 1 torr. Lower pressures can be achieved, but the cost of creating such vacuums may increase and there may not be a substantial added benefit from greater vacuums (i.e., lower pressure).

Both the first and second inner housings 104, 106 comprise sealed structures sufficient to maintain the vacuum pressure. In accordance with the preferred embodiment, first inner housing 106 is constructed from metal, ceramic titanium, durable plastic, or any other material with sufficient stress resistance to withstand the pressure differential created by the vacuum. Second inner housing 104 preferably also is constructed from metal, ceramic titanium, durable plastic or other material with sufficient stress resistance to withstand the pressure differential created by the vacuum. The electrical connector 136 preferably is sealed to maintain the vacuum in interstitial volume 105. Connector 136 is sealed preferably using a sealing compound such as ceramic titanium or other suitable sealing arrangement. The electrical conductors 134 pass through or mate with connector 137 mounted or formed in a side surface of the first inner housing 106. Connector 137 also is sealed using a conventional sealing arrangement to maintain the vacuum of interstitial volume 105.

Figure 2:
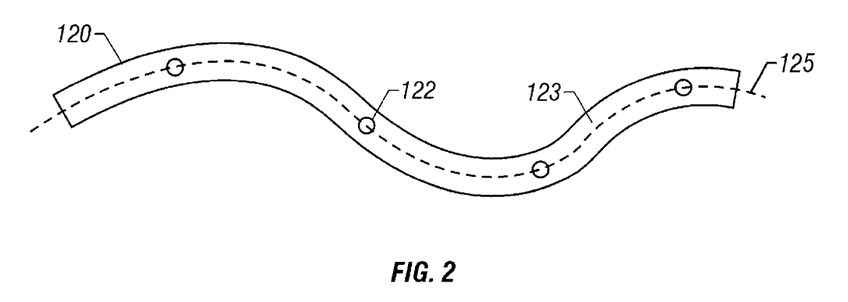
FIG. 2 is a side view of a support structure used in the security system of FIG. 1.

Referring now to FIG. 2, each support structure 120 preferably is hollow with one or more holes 122 in a side surface 123. The support structures 120 may be circular in cross section as shown, or any other shape as desired. The purpose of the holes 122 is permit the vacuum to permeate the support structures 120 so that pressure transducers 124 will detect a vacuum breach even if a person was to drill through the longitudinal axis 125 of the support structure. Further, a double curved shape may be preferred to prevent someone from drilling from one end of the support structure to the other through the interior volume of support structure 120.

Referring again to FIG. 1, the particle detectors 126 preferably are highly sensitive devices that can detect the presence of particles such as electrons, ions, VUV, soft x-rays, and other nuclear particles, in a vacuum environment. The MD-501 Channel Electron Multiplier Electron and Ion Detector available from AMPTEKTRON is a suitable particle detector. The particle detector 126 preferably detects the presence of even a single particle in a vacuum pressure, for example, less than 1×10E-4 torr. The MD-501 particle detector 126 has four electrical connections. Power supply voltage and ground are provided to two connections to provide suitable operating power for the device. The output signal from the device is a pulse output signal which preferably is provided to a counter or ratemeter (not specifically shown in FIG. 1) which computes the density of particles in interstitial volume 105.

As explained, the pressure transducers 124 provide a mechanism for the security system 100 to detect when the vacuum of interstitial volume 105 is breached. If, however, the security system 100 was placed in a vacuum chamber that matches the vacuum pressure of the interstitial volume 105, it is possible for the pressure transducers 124 to fail to detect a change in pressure as there may not be a pressure gradient between interstitial volume 105 and the outside of the security system 100.

To solve this potential problem, the security system 100 includes the particle detectors 126. It generally is very difficult, if not impossible, to achieve a perfect vacuum (i.e., 0 torr) in interstitial volume 105. Further, purer vacuums (i.e., vacuums with lower pressure) generally are more expensive to create than higher pressure vacuums. Accordingly, even if possible, it may not be desirable to have a perfect vacuum in interstitial volume 105. Thus, interstitial volume 105 generally includes one or more particles of oxygen, nitrogen, carbon dioxide, carbon monoxide, or any other gas or air-borne contaminants. That is, there will be at least a few detectable particles, albeit not many.

The particle detectors 126 preferably are sensitive enough to detect these particles and detect changes in the number of particles per unit volume of space. If a vacuum pressure could be created to surround the security system 100 and match the vacuum pressure of the interstitial volume 105, there will still be a change in particle density if someone was to drill through the second inner housing 104 into the interstitial volume 105. Although this change in particle density will be transient (i.e., temporary) until the particle density equilibrates in and around the security system 100, the particle detectors 126 will detect this transient condition and the security system will respond appropriately as described below.

Referring still to FIG. 1 and as noted above, the interstitial volume with its vacuum functions as protective "moat" surrounding the information contained in the first inner housing 106. A side effect of the vacuum is that it also thermally insulates the first inner housing 106 and the electronics contained therein. Thus, any heat generated by the electronics in the first inner housing will remain in the first inner housing and potentially damage the electronics unless the heat is removed. Accordingly, a heat removal system 130 is included to conduct the heat away from the first inner housing 106 onto the top surface 131 of the heat removal system 130. The fan 114 blows air across top surface 131, which will be warm or hot from the heat generated by the electronics in the first inner housing 106, and out vents 116 to the outside environment. The heat removal system 130 is shown better in FIG. 3 and will be described further below.

Figure 3:
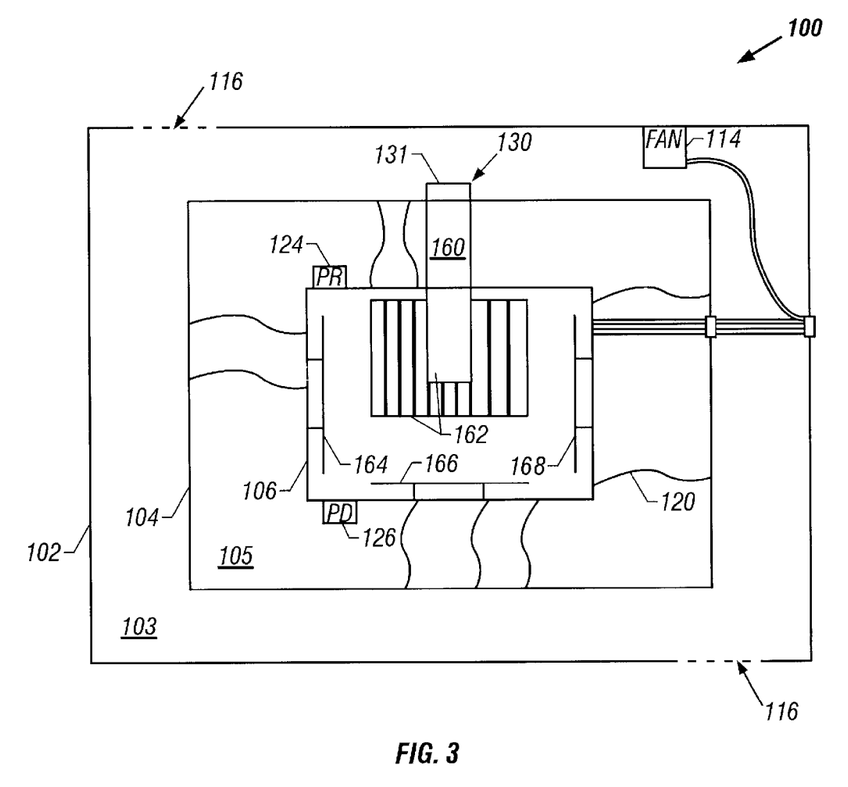
FIG. 3 is a cross-sectional view of the security system and enclosure of FIG. 1.

Referring now to the cross-sectional view of FIG. 3 heat removal system 130 preferably comprises thermoelectric material 160 (referred to hereinafter as a "thermoelectric device") and a heat conductor 162. The heat conductor 162 thermally couples to one or more circuit boards or modules 164, 166, 168 to receive the heat generated by electronics mounted on the circuit boards. The heat collected by the heat conductor is provided to the thermoelectric device. In accordance with the preferred embodiment, the circuit boards or electronics contained thereon do not necessarily connect directly to heat conductor 162, although a direct thermal connection to the heat conductor 162 is acceptable. Instead, first inner housing 106 is pressurized with a suitable gas, such as helium, to provide an adequate thermal conduction or radiation path from the electronics to the heat conductor 162. The gas is injected during manufacturing through port 139, which preferably comprises a check valve. Other methods for injecting helium into the first inner housing 106 while preventing the helium from exiting into the interstitial volume 105 are also acceptable. A suitable gas is helium as it has a relatively high heat capacity, 5.23 joules per gram, and is non-flammable so it is safe. Preferably, the pressure of helium in the first inner housing 106 is approximately 200 atmospheres, although the pressure can be varied as desired. Preferably, no water vapor is present inside the first inner housing 106 to prevent corrosion of the electrical components contained therein. To prevent the presence or build-up of water vapor, any well known desiccant can be included in the first inner housing 106.

The thermoelectric device 160 preferably consists of a semiconductor material, such as bismuth telluride, separating two dissimilar conductors. A voltage is applied to the device and, in accordance with the Peltier effect, known to those of ordinary skill in the art, the voltage causes the thermal electric device to move or "pump" heat from one end of the device to the other end. The direction in which the heat is pumped through the device can be reversed by reversing the polarity of the applied voltage. Suitable thermal electric devices are available from Tellurex Corporation, Traverse City, Mich.

Thus, an electrical voltage is provided from electronics in the first inner housing 106 to the thermal electric device to pump heat generate in the inner housing to the outside. If, however, the security system 100 is operated in an environment colder than the heat generated by the electronics, it may be necessary to warm the electronics. The electronics can be warmed by reversing the polarity of the voltage provided to the thermal electric device 160 to reverse the direction of heat flow through the device.

Another benefit of thermoelectric material is that although in accordance with the Peltier effect, the material can pump heat, in accordance with the Seebeck effect, the material also can generate electrical current when the material is exposed to a temperature gradient. Thus, electrical energy generated by the thermoelectric device 160 can be used by recharging circuitry in the power supply 110 to charge battery pack 112.

Figure 4:
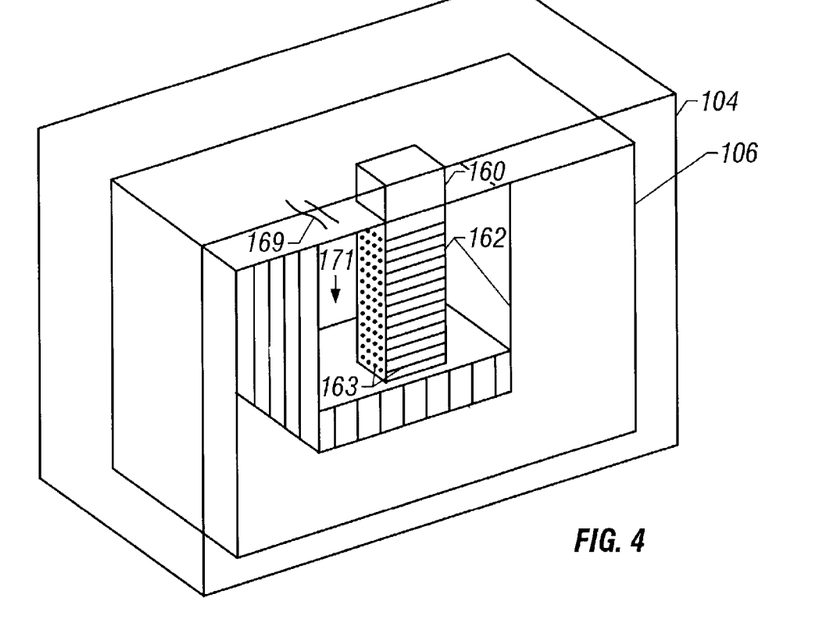
FIG. 4 shows the bores formed in a heat sink attached to the enclosure of FIG. 1.

If the thermoelectric device 160 and heat conductor 162 comprised solid material, it might be possible for someone to drill through these materials to gain access to the inner volume of first inner housing 105. Someone could insert an electronic probe through such a hole in the materials comprising heat removal system 130 to retrieve the data to be protected, thereby defeating the security features of the security system 100. The heat conductor 162, however, is constructed in such a way to prevent this from happening. Referring to FIG. 4, the heat conductor 162, as shown, preferably comprises a plurality of bores 163 drilled therethrough. The bores are arranged sufficiently close together or in any other way that it would be difficult, if not impossible, to drill through the thermoelectric device 160 and through the heat conductor 162 without the drilling device puncturing or otherwise entering one or more of the bores 163. The volume 169 formed by the heat conductor shares the vacuum formed in the interstitial space via slits 171. Once a bore cavity is punctured, the vacuum of the interstitial volume will be breached, one or more of the pressure sensors 124 will detect a change in pressure, as explained below, and the security system will secure the data from theft.

Referring now to FIG. 5, the electronics contained within the first inner housing 106 generally comprises data storage device 180, a switch 184, an energy storage device 188, control logic 190, and sensor controller 194. If desired, other components and logic may be included in first inner housing 106. The power supply 110 and battery 112 provide power to the various electrical components contained within inner housing 106. The battery 112 preferably is used as a source of power if the power supply 110 is unable to supply power, for example, due to a loss of AC power or the security system is being transported and AC power is unavailable.

The data storage device 180 contains the data that is protected from theft or other type of unauthorized access by security system 100. Data storage device 180 may be, for example, a flash read only memory ("ROM") device or any other suitable type of volatile or nonvolatile memory. Volatile memory is memory which loses the data stored therein if power is turned off to the device. Nonvolatile memory retains its contents even if power is removed. Suitable types of volatile memory include dynamic random access memory ("DRAM"), synchronous DRAM ("SDRAM"), and extensive data output DRAM ("EDO DRAM"). Suitable types of nonvolatile memory include flash read only memory ("ROM") and electrically erasable programmable ROM ("EEPROM"). Further, the data storage device may comprise a plurality of flash ROM devices or other memory types if desired for additional storage capacity.

The sensor controller 194 receives sensor signals from pressure sensors 124 and particle detectors 126. The sensor controller 194 interprets the pressure sensor and particle detector signals to determine the occurrence of a security breach. Generally, the sensor controller 194 monitors the signals received from sensors 124, 126 for a change in voltage level. A change in voltage level from pressure sensors 124 indicates a change in pressure in interstitial volume 105 which may result from someone drilling through second inner housing 104 or otherwise accessing the interstitial volume 105.

Any suitable pressure sensor can be used as pressure sensor 124. Many pressure sensors require a regulated voltage to be provided to the sensor as a reference signal level from which the output pressure signal is determined. That reference signal level is shown in FIG. 5 as the POWER signal provided to pressure sensor 124 via sensor controller 194. The pressure sensor 124 generates an output pressure signal, PR OUT, which preferably is a DC voltage between 0 and 5 volts that is proportional to the pressure. The PR OUT signal is provided to the sensor controller 194 which samples the PR OUT signal at a predetermined rate and generates a digital signal, PRESSURE, which indicates the pressure level and provides the PRESSURE signal to the control logic 190.

The following discussion of the particle detectors 126 assumes the use of the MD-501 electron and ion detector from AMPTEKTRON. The sensor controller provides a suitable operating voltage from the power supply 110 to the particle detector via the PWR signal. A suitable voltage for the MD-501 includes a DC voltage in the range of 10 to 15 VDC. The particle detector 126 has an inlet aperture (not specifically shown) in which particles can pass and an electron multiplier (also not shown) which generates a voltage pulse for each particle impinging on the electron multiplier. The voltage pulse is amplified and provided as the PD OUT signal to a counter 196 included as part of the sensor controller 194. The counter 196 counts each pulse and converts the count to a DC voltage proportional to the number of detected particles entering the particle detector 126 per second. If desired, a separate counter 196 may be provided for each particle detector 126, if multiple particle detectors are used. The sensor controller 194 generates a PARTICLE signal indicative of the sensed particle density and provides the PARTICLE signal to the control logic 190. As an alternative, the control logic 190 may be coupled to the sensor controller 194 via a bus. Over such a bus, the control logic 190 can issue requests to the sensor controller to provide the pressure and particle density information to the control logic.

The control logic 190 monitors the level of the PRESSURE and PARTICLE signals and determines if a security breach is occurring. This determination is made by the control logic 190 by comparing the level of the PRESSURE and PARTICLE signals to appropriate predetermined threshold values set at a level to account for normal variation in pressure and particle density. The control logic 190 interprets a PRESSURE or PARTICLE signal exceeding its applicable threshold as a security breach and reacts as explained below to secure the data stored in data storage device 180. Alternatively, the pressure and particle density thresholds may include upper and lower limits. In this case, the control logic 190 interprets a PRESSURE or PARTICLE signal exceeding its applicable threshold range, a signal level that is higher than the upper limit or lower than the upper limit, as a security breach. Each threshold range is selected to permit normal variations in either pressure or particle density without being interpreted by control logic 190 as a security breach. If the voltage level of the PRESSURE signal exceeds its applicable threshold range, the control logic 190 determines that a change in pressure has occurred indicating a breach to the vacuum present in the interstitial volume 105. Similarly, if the voltage level of the PARTICLE signal exceeds its applicable threshold range, the control logic 190 determines that a change in particle density has occurred indicating a breach to the interstitial volume 105.

As an alternative to comparing the voltage level of the PARTICLE and PRESSURE signals to thresholds, the control logic 190 instead may compute and monitor the ratio of the PRESSURE signal level to the PARTICLE signal level. This ratio value normally will be fairly constant within a certain range. If, however, the ratio value exceeds its normal range (i.e., becoming greater than a higher threshold or becoming less than a lower threshold), the control logic 190 registers a security breach and responds appropriately as explained below.

Referring still to FIG. 5, when the control logic 190 determines that a security breach is occurring or has occurred, the control logic 190 takes appropriate action to secure the data stored in data storage device 180 to thereby prevent the data from being retrieved from the data storage device, either by authorized or unauthorized personnel. In accordance with the preferred embodiment, the control logic 190 erases the data storage device. One technique for erasing the storage device 180 includes using standard memory control techniques to overwrite the existing data with a random or predetermined data pattern via control lines 198.

Alternatively, erasure of data can be accomplished by physically destroying the data storage device 180. "Destroying" the device means physically damaging the device in such a way to preclude subsequent reading of the device to obtain the sensitive data stored therein. Thus, once "destroyed" the data storage device is 180 rendered unable to be accessed to retrieve the data stored therein. The purpose of the energy storage device 188 is to deliver a sufficient energy jolt or power surge through switch 184 to the data storage device 180 to damage the storage device.

The energy storage device 188 preferably comprises a capacitor or any other suitable device, such as a 0.5 Farad capacitor that can store enough electrical energy that, when delivered through switch 184, can ruin data storage device 180. The capacitor may be electrolytic, wirewound or any other suitable capacitor type. As is well known in the art, a capacitor can store electrical energy and subsequently deliver its stored energy to a load. In this case, the power supply 110 or battery 112 charge up the capacitor. Once charged, very little current is needed from power supply 110 to keep the capacitor charge. Some charge leakage may occur, however, and thus the power supply 110 may need to periodically top off the charge on the capacitor.

The minimum amount of energy needed to destroy the data storage device 180 depends on the type of storage device chosen and the number of memory devices used in which the data is stored. However, delivering one ampere of DC current generally is enough to destroy most, if not all, types of memory storage devices. Thus, energy storage device 188 preferably delivers one ampere of current, although the precise amount of current provided by energy storage device 188 can be varied as needed. The energy storage device 188 preferably provides the required current level to destroy the data storage device 180.

Switch 184 preferably is an electromechanical or solid state single pole, single throw switch that normally is in the "open circuit" position preventing the energy storage device 188 from delivering its charge to the data storage device 180. When closed, switch 184 completes a conduction pathway from the energy storage device 188 to the data storage device 180 thereby permitting the energy storage device 188 to deliver its energy to the storage device. Preferably, the control logic 190 controls the state of switch 184 by SWITCH CONTROL signal 195. When the SWITCH CONTROL SIGNAL 195 is deasserted, the switch 184 remains open. However, when asserted, SWITCH CONTROL signal 195 causes the switch 184 to close and data storage device 180 to be destroyed.

Figure 6:
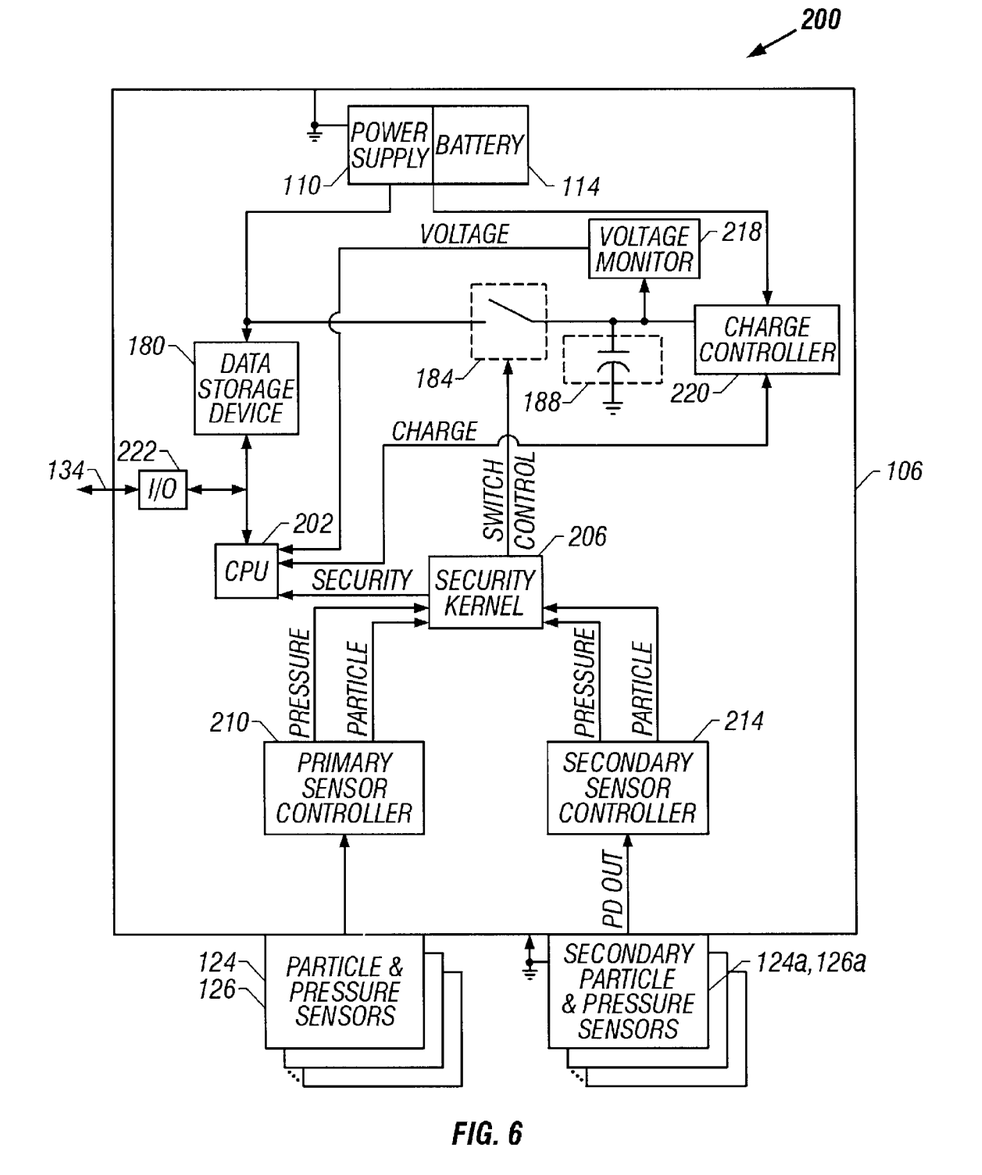
FIG. 6 shows an alternative embodiment of the security system.

An alternative embodiment is shown in FIG. 6. As shown, the security system, denoted as an alternative embodiment by using reference numeral 200 instead of 100 as before, includes power supply 110, battery 112, data storage device 180, pressure sensors 124 and particle detectors 126. Switch 184 is shown as a single pole, single throw switch and may be electromechanical or solid state as noted above. Energy storage device 188 is shown as a capacitor. Security system 200 also includes a central processing unit ("CPU") 202, a security kernel 206, a voltage monitor 218, charge controller 220 and input/output module ("I/O") 222.

The CPU 202 writes data to and reads data from data storage device 180. An external device (not shown) can write data to or read data from the data storage device 180 through input/output module 222 which is constructed in accordance with the whatever external communication protocol or signal level is desired. As should be apparent to one of ordinary skill in the art, input/output module 222 may have receivers, transmitters, signal level converters and the like.

The sensor controller 194 from the embodiment shown in FIG. 5 has been replaced with a primary sensor controller 210 and a secondary or backup sensor controller 214. Secondary sensor controller 214 may be included for redundancy in the event the primary sensor controller 210 fails or malfunctions. Further, a primary set of pressure and particle sensors 124, 126 and a secondary set of pressure and particle sensors 124a, 126a couple to the primary and secondary sensor controllers 210, 214, respectively. The security kernel 206 preferably receives particle and pressure information from both controllers 210, 214, but uses only the signals from the primary controller 210. If, however, the primary controller 210 fails, as detected by obviously false readings or lack of any readings from the primary controller, the security kernel 206 instead uses the particle and pressure signals from the secondary controller 214.

The voltage monitor 218 senses or detects the voltage of the energy storage device 188 and provides a VOLTAGE signal to CPU 202 indicating the voltage of the energy storage device 188. The CPU 202 periodically checks the voltage level on the VOLTAGE signal line and, if the voltage has decreased below a predetermined or computed level, the CPU asserts the CHARGE control signal to the charge controller 220 to top off the charge on energy storage device 188. In this manner, or any other suitable manner, the energy storage device 188 is kept fully charged and ready to deliver a current sufficient to destroy the data storage device 180.

In addition to monitoring the health and status of the primary sensor controller 210, the security kernel 206 interprets the PRESSURE and PARTICLE signals from the sensor controllers 210, 214 and determines if a security breach is occurring or has occurred as discussed above with respect to control logic 190. If a security breach is detected, the security kernel responds by either having the data storage device 180 erased which includes overwriting the data or physical destruction of the memory device containing the data. To erase the storage device 180, the security kernel asserts a SECURITY signal to the CPU 202 which responds by erasing data storage device 180 using known memory techniques. If destruction of the data storage device 180 is desired, the security kernel 206 asserts the SWITCH CONTROL signal to the switch 184 which then closes permitting capacitor 188 to deliver a power surge to data storage device 180 ruining the device. The capacitor 188 may also connect to the security kernel itself, thereby also destroying the security kernel 206. Further, the capacitor can be connected to any other device in the system that preferably is destroyed upon detection of a security breach. The size of the capacitor is chosen dependent upon the amount of energy it needs to store and deliver as should be understood by one of ordinary skill in the art and described above. The system 100 can be programmed to either erase without destroying or destroy the storage device. In one embodiment, only the erasing (without destruction) or destruction technique, but not both, may be implemented.

Figure 7:
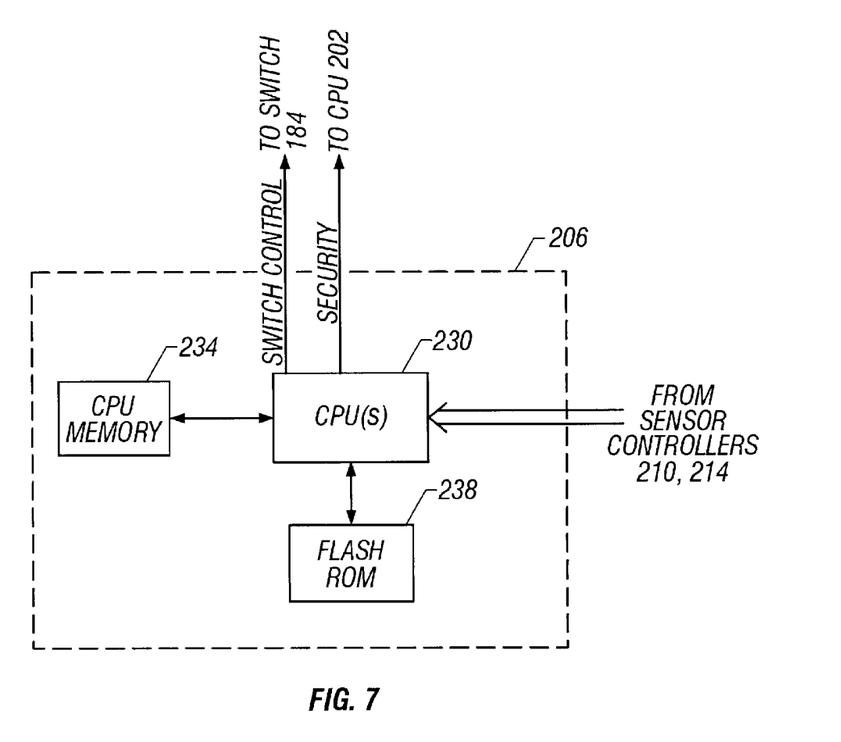
FIG. 7 shows a block diagram of a security kernel shown in FIG. 6.

Referring now to FIG. 7, the security kernel 206 preferably includes its own CPU 230, or multiple CPUs if desired, memory 234 and flash ROM 238. The CPU 230 preferably executes code stored permanently in programmable flash ROM 238. In accordance with conventional techniques, during initialization the CPU 230 copies the code from flash ROM 238 to memory 234 for subsequent execution. The code executed by the CPU 230 preferably activates the appropriate sensor controller, monitors the various signals from the primary or secondary sensor controllers 210, 214, determines when a security breach is occurring and reacts accordingly as discussed above.

Numerous variations and modifications will become apparent to those skilled in the art once the above disclosure is fully appreciated. It is intended that the following claims be interpreted to embrace all such variations and modifications.

What is claimed is:

1. A security system that protects information contained therein, comprising:
   a first inner housing containing information to be protected;
   a second inner housing, said first inner housing disposed within said second inner housing so as to create an interstitial volume between said first and second inner housings, a vacuum formed in said interstitial volume;
   security logic contained within said first inner housing; and
   at least one pressure transducer coupled to said security logic to detect the pressure of the interstitial volume;
   said security logic responds to a pressure signal from said at least one pressure transducer by altering the information to be protected.

2. The security system of claim 1 wherein said at least one pressure transducer includes a plurality of pressure transducers.

3. The security system of claim 1 wherein said at least one pressure transducer is mounted to a surface of said first inner housing exposed to said interstitial volume.

4. The security system of claim 1 wherein said information to be protected is stored on a memory device.

5. The security system of claim 1 wherein security logic secures said information by erasing said memory device.

6. The security system of claim 5 further including an energy storage device selectably coupled to said memory device.

7. The security system of claim 6 wherein security logic secures said information by causing said energy storage device to deliver enough electrical energy to said memory device to damage said memory device preventing the information contained therein from being accessed.

8. The security system of claim 6 further including a switch disposed between said energy storage device and said memory device.

9. The security system of claim 8 wherein said security logic secures said information by asserting a signal to said switch causing said switch to close and said energy storage device to deliver enough electrical energy through said switch to said memory device to damage said memory device preventing the information contained therein from being accessed.

10. The security system of claim 1 further including at least one particle detector coupled to said security logic to detect the particle density of the interstitial volume.

11. The security system of claim 1 further including a plurality of particle detectors coupled to said security logic to detect the particle density of the interstitial volume.

12. The security system of claim 10 wherein said at least one particle detector is mounted to a surface of said first inner housing exposed to said interstitial volume.

13. The security system of claim 10 wherein said at least one particle detector provides a particle detector signal indicative of the density of particles in said interstitial volume to said security logic which interprets the particle detector signal to determine the occurrence of a change in particle density of the interstitial volume.

14. The security system of claim 13 further including an energy storage device selectably coupled to said memory device.

15. The security system of claim 14 wherein security logic interprets the pressure signal and the particle detector signal to determine the occurrence of a change in pressure or a change particle density and if either change has occurred secures said information by causing said energy storage device to deliver enough electrical energy to said memory device to damage said memory device preventing the information contained therein from being accessed.

16. The security system of claim 15 further including a switch disposed between said energy storage device and said memory device through which electrical energy stored in said energy storage device can flow to said memory device.

17. The security system of claim 16 wherein said security logic secures said information by asserting a signal to said switch causing said switch to close and said energy storage device to deliver enough electrical energy through said switch to said memory device to damage said memory device preventing the information contained therein from being accessed.

18. A security system that protects information contained therein, comprising:
   a first inner housing containing said information to be protected;
   a second inner housing, said first inner housing disposed within said second inner housing so as to create an interstitial volume between said first and second inner housings, a vacuum formed in said interstitial volume;
   security logic contained within said first inner housing;
   at least one pressure transducer coupled to said security logic to detect the pressure of the interstitial volume;
   wherein said security logic responds to a pressure signal from said at least one pressure transducer by altering the information to be protected; and
   a heat conductor to conduct heat generated inside said first inner housing through said interstitial volume to the area surrounding said second inner housing.

19. A security system that protects information contained therein, comprising:
   a first inner housing containing said information to be protected;
   a second inner housing, said first inner housing disposed within said second inner housing so as to create an interstitial volume between said first and second inner housings, a vacuum formed in said interstitial volume;

an outer housing, said first and second inner housings disposed within said outer housing;

security logic contained within said first inner housing; and at least one pressure transducer coupled to said security logic to detect the pressure of the interstitial volume;

wherein said security logic responds to a pressure signal from said at least one pressure transducer by altering the information to be protected.

20. The security system of claim 19 further including a heat removal system to remove heat generated inside said first inner housing to the area surrounding said second inner housing.

21. The security system of claim 20 wherein said heat removal system includes a thermoelectric material at least part of which is located in the interstitial volume and couples electrically to said security logic.

22. The security system of claim 21 further including a fan disposed in the area between the outer housing and the second inner housing, the outer housing including vents through which air blown by the fan can exit the security system.

23. A security system that protects information contained therein, comprising:

a first inner housing containing said information to be protected;

a second inner housing, said first inner housing disposed within said second inner housing so as to create an interstitial volume between said first and second inner housings, a vacuum formed in said interstitial volume;

wherein said first and second inner housings are connected mechanically by a plurality of support structures, each support structure having a surface exposed to said interstitial volume;

security logic contained within said first inner housing; and at east one pressure transducer coupled to said security logic to detect the pressure of the interstitial volume;

wherein said security logic responds to a pressure signal from said at least one pressure transducer by altering the information to be protected.

24. The security system of claim 23 wherein said support structures have a hollow interior region.

25. The security system of claim 24 wherein said support structures have at least one bore in a surface exposed to said interstitial volume so that a vacuum is formed in said hollow interior region.

26. A method of protecting information, comprising:

(a) storing said information in a first inner housing disposed within a second inner housing;

(b) forming a vacuum in the volume between said first and said second inner housing;

(c) monitoring the pressure of said volume; and (d) altering the information if a change in pressure is detected in step (c).

27. The method of claim 26 wherein step (a) includes storing the information on a memory device.

28. The method of claim 27 wherein step (d) includes erasing the information from the memory device.

29. The method of claim 27 wherein step (d) includes providing a power surge to the memory device thereby rendering the memory incapable of functioning to provide the information.

30. The method of claim 27 further including monitoring the particle density of said volume.

31. The method of claim 30 wherein step (d) includes erasing the information from the memory device if a change in pressure is detected or a change in particle density is detected.

32. The method of claim 30 wherein step (d) includes, if a change in pressure is detected or a change in particle density is detected, providing a power surge to the memory device thereby rendering the memory incapable of being accessed to read the information.

33. A data protection device, comprising:

a first inner housing containing information to be protected;

a second inner housing, said first inner housing disposed within said second inner housing so as to create an interstitial volume between said first and second inner housings;

security logic contained within said first inner housing; and at least one particle detector coupled to said security logic to detect the particle density of the interstitial volume;

said security logic responds to a particle density signal from said at least one particle detector by securing the information to be protected.

34. The data protection device of claim 33 further including a memory device coupled to said security logic in which the information to be protected is stored and said security logic erases said memory device if the particle density of the interstitial volume exceeds a threshold.

35. The data protection device of claim 34 further including at least one pressure sensor disposed in said interstitial volume and coupled to said security logic to detect the pressure of said interstitial volume.

36. The data protection device of claim 35 wherein said security logic erases said memory device if the particle density of the interstitial volume exceeds a threshold or the pressure of the interstitial volume exceeds a threshold.

37. The data protection device of claim 33 further including:

at least one pressure sensor disposed in said interstitial volume to detect the pressure of said interstitial volume;

a memory device coupled to said security logic, said memory device containing the information to be protected;

an energy storage device in which energy can be stored;

a switch disposed between said energy storage device and said memory device and receiving a control signal from said security logic, said switch normally open disconnecting the energy storage device from said memory device, and said switch can be closed via the control signal from said security logic;

said security logic monitors the pressure and particle density of the interstitial volume and asserts the control signal causing the switch to close and the energy stored in said energy storage device to be delivered to said memory device thereby rendering said memory device unable to be accessed to retrieve the data stored therein.

* * * * *